(12) United States Patent
Chen

(10) Patent No.: US 12,456,594 B2
(45) Date of Patent: Oct. 28, 2025

(54) CONTROL DEVICE

(71) Applicant: Primax Electronics Ltd., Taipei (TW)

(72) Inventor: Bo-An Chen, Taipei (TW)

(73) Assignee: Primax Electronics Ltd., Taipei (TW)

( * ) Notice: Subject to any disclaimer, the term of this patent is extended or adjusted under 35 U.S.C. 154(b) by 242 days.

(21) Appl. No.: 18/228,317

(22) Filed: Jul. 31, 2023

(65) Prior Publication Data

US 2025/0014848 A1 Jan. 9, 2025

(30) Foreign Application Priority Data

Jul. 5, 2023 (TW) ................................. 112125139

(51) Int. Cl.
| | |
|---|---|
| *H01H 13/83* | (2006.01) |
| *G06F 3/02* | (2006.01) |
| *G06F 3/039* | (2013.01) |
| *G06F 3/041* | (2006.01) |
| *H01H 13/14* | (2006.01) |

(52) U.S. Cl.
CPC ........... *H01H 13/83* (2013.01); *G06F 3/0202* (2013.01); *G06F 3/0393* (2019.05); *G06F 3/041* (2013.01); *H01H 13/14* (2013.01)

(58) Field of Classification Search
CPC ...... H01H 13/83; H01H 13/14; H01H 13/023; G06F 3/0202; G06F 3/0393; G06F 3/041; G06F 3/02; G06F 3/039
See application file for complete search history.

(56) References Cited

U.S. PATENT DOCUMENTS

| | | | |
|---|---|---|---|
| 6,184,481 B1 * | 2/2001 | Chen ..................... | H01H 13/705 200/341 |
| 11,204,651 B2 * | 12/2021 | Cai ......................... | H01H 13/52 |
| 2018/0040440 A1 * | 2/2018 | Enomoto ............... | H01H 13/83 |

* cited by examiner

*Primary Examiner* — Lheiren Mae A Caroc
(74) *Attorney, Agent, or Firm* — KIRTON McCONKIE; Evan R. Witt

(57) ABSTRACT

A display panel and a see-through key module are provided. The see-through key module is located over the display panel. The see-through key module includes at least one keycap, at least one hollow key frame and at least one elastic element. The keycap is a hard structure and includes a first engaging structure. The hollow key frame includes a second engaging structure. The keycap and the hollow key frame are detachably connected with each other through the first engaging structure and the second engaging structure. The elastic element is arranged between the display panel and the keycap. The elastic element includes a hollow elastic wall and a hollow lower part. The hollow key frame is fixed on the hollow elastic wall. The hollow elastic wall is arranged between the hollow key frame and the hollow lower part.

19 Claims, 16 Drawing Sheets

CONTROL DEVICE

FIELD OF THE INVENTION

The present invention relates to a see-through key module and a control device with the see-through key module, and more particularly to a control device with a see-through key module, in which the see-through key module is installed on a display panel for allowing a graphic image shown on the display panel to be completely exposed and providing tactile feel like a physical key in order to facilitate the user to select a function or command corresponding to the graphic image.

BACKGROUND OF THE INVENTION

Nowadays, a control device is usually equipped with plural see-through key modules. However, the keycap of the see-through key module is not replaceable. In other words, the design of the see-through key module cannot meet the needs of the consumers who desire to be different from others and to express themselves.

Moreover, the see-through key module further comprises an elastic element. The elastic element is located beside the keycap and made of a soft material. When the keycap is pressed by the user, the pressing force is transmitted to the underlying switch circuit through the elastic element. However, since the soft elastic element absorbs a portion of the transmission kinetic energy, the pressing force cannot be well transmitted downwardly to the switch circuit. In other words, the design of the conventional see-through key module is unable to provide satisfactory tactile feel to the user. Moreover, due to the structural design of the conventional see-through key module, the switch circuit cannot be triggered immediately and smoothly.

SUMMARY OF THE INVENTION

In order to overcome the drawbacks of the conventional technologies, the present invention provides a see-through key module. The keycap of the see-through key module is replaceable. The see-through key module is specially designed. Consequently, when the keycap is pressed by the user, the pressing force can be effectively transmitted to the underlying component. Furthermore, the present invention further provides a control device with the see-through key module.

In accordance with an aspect of the present invention, a control device is provided. The control device includes a display panel and a see-through key module. At least one graphic image and at least one non-graphic image are shown on the display panel. The see-through key module is located over the display panel. The at least one non-graphic image is shaded by the see-through key module along a vertical direction. The graphic image is exposed through the see-through key module. The see-through key module includes at least one keycap, at least one hollow key frame and at least one elastic element. Each of the at least one keycap is a light-transmissible hard structure and includes a first engaging structure. Each of the at least one hollow key frame includes a second engaging structure. Each of the at least one keycap and the corresponding hollow key frame are detachably connected with each other through the first engaging structure and the second engaging structure. The at least one elastic element is arranged between the display panel and the keycap. Each of the at least one elastic element includes a hollow elastic wall and a hollow lower part. The hollow key frame is fixed on the hollow elastic wall. The hollow elastic wall is arranged between the corresponding hollow key frame and the hollow lower part. The hollow elastic wall is permitted to be subjected to deformation and returned to an original position. The at least one graphic image shown on the display panel is transmitted upwardly and exposed through the hollow lower part of the corresponding elastic element, the hollow elastic wall of the corresponding elastic element, the corresponding hollow key frame and the corresponding keycap.

In an embodiment, each of the at least one hollow key frame is a hard structure.

In an embodiment, each of the at least one hollow key frame is made of polycarbonate, polyoxymethylene, aluminum alloy, aluminum magnesium alloy or zinc alloy.

In an embodiment, the hollow elastic wall of each of the at least one elastic element and the corresponding hollow key frame are combined together by using an embedding injection process, an embedding extrusion process, a double injection or a glue bonding process.

In an embodiment, the first engaging structure of each of the at least one keycap is a hook, and the second engaging structure of each of the at least one hollow key frame is a locking recess.

In an embodiment, each of the at least one hollow key frame further includes at least one bump structure, and the at least one bump structure is formed on a bottom edge of the corresponding hollow key frame.

In an embodiment, the control device further includes a switch circuit, and the switch circuit is arranged between the see-through key module and the display panel.

In an embodiment, the switch circuit includes an upper film layer, a spacer structure and a lower film layer. The upper film layer includes a first top surface, at least one first light-transmissible opening and a first bottom surface. The lower film layer includes a second top surface, at least one second light-transmissible opening and a second bottom surface. The at least one first light-transmissible opening of the upper film layer is arranged between the first top surface of the upper film layer and the first bottom surface of the upper film layer. The first bottom surface of the upper film layer faces the lower film layer. The at least one second light-transmissible opening of the lower film layer is arranged between the second top surface of the lower film layer and the second bottom surface of the lower film layer. The second top surface of the lower film layer faces the upper film layer. The at least one graphic image shown on the display panel is transmitted upwardly through the at least one second light-transmissible opening of the lower film layer and the at least one first light-transmissible opening of the upper film layer. The spacer structure is arranged between the first bottom surface of the upper film layer and the second top surface of the lower film layer. The upper film layer and the lower film layer are separated from each other by the spacer structure.

In an embodiment, the upper film layer further includes at least one first circuit contact point. The at least one first circuit contact point is formed on the first bottom surface of the upper film layer. The lower film layer further includes at least one second circuit contact point. The at least one second circuit contact point is formed on the second top surface of the lower film layer. The at least one first circuit contact point of the upper film layer and the corresponding second circuit contact point of the lower film layer are overlapped with each other along the vertical direction. The at least one first circuit contact point of the upper film layer and the corresponding second circuit contact point of the lower film layer are separated from each other by the spacer structure.

In an embodiment, each of the at least one hollow key frame and the corresponding first circuit contact point of the upper film layer are overlapped with each other along the vertical direction, and each of the at least one hollow key frame and the corresponding second circuit contact point of the lower film layer are overlapped with each other along the vertical direction.

In an embodiment, each of the at least one hollow key frame further includes at least one bump structure, and the at least one bump structure is formed on a bottom edge of the corresponding hollow key frame. Each of the at least one bump structure, the corresponding first circuit contact point of the upper film layer and the corresponding second circuit contact point of the lower film layer are overlapped with each other along the vertical direction.

In an embodiment, the spacer structure includes at least one ink structure, and the at least one ink structure is formed on the first bottom surface of the upper film layer or the second top surface of the lower film layer. The at least one ink structure is located near the at least one first circuit contact point of the upper film layer or the at least one second circuit contact point of the lower film layer.

In an embodiment, the spacer structure includes a separation film layer, and the separation film layer includes at least one third light-transmissible opening and at least one indented region, wherein the at least one first light-transmissible opening of the upper film layer, the corresponding second light-transmissible opening of the lower film layer and the corresponding third light-transmissible opening of the separation film layer are overlapped with each other along the vertical direction, and the at least one first circuit contact point of the upper film layer, the corresponding indented region of the separation film layer and the corresponding second circuit contact point of the lower film layer are overlapped with each other along the vertical direction.

In an embodiment, the control device further includes a contact point layer, and the contact point layer is arranged between the upper film layer and the see-through key module. The contact point layer includes a third top surface, a third bottom surface and at least one bump structure. The at least one bump structure of the contact point layer is formed on the third top surface of the contact point layer. The at least one bump structure of the contact point layer, the corresponding first circuit contact point of the upper film layer and the corresponding second circuit contact point of the lower film layer are overlapped with each other along the vertical direction.

In an embodiment, the control device further includes a contact point layer, and the contact point layer is arranged between the upper film layer and the see-through key module. The contact point layer includes a contact point region and a light-transmissible region. The non-graphic image is covered by the contact point region along the vertical direction. The graphic image is exposed through the light-transmissible region along the vertical direction.

In an embodiment, the display panel is a touch display panel.

In an embodiment, the touch display panel has a resistive touch control mechanism or a capacitive touch control mechanism.

In an embodiment, the control device further includes a protection layer, and the protection layer is arranged between the see-through key module and the touch display panel.

In an embodiment, each of the at least one elastic element further includes a support part, and the support part is contacted with a bottom side of the corresponding hollow key frame.

In accordance with another aspect of the present invention, a see-through key module is provided. The see-through key module is installed on a display panel. The see-through key module includes at least one keycap, at least one hollow key frame and at least one elastic element. Each of the at least one keycap is a hard structure and includes a first engaging structure. Each of the at least one hollow key frame is the hard structure and includes a second engaging structure. Each of the at least one keycap and the corresponding hollow key frame are detachably connected with each other through the first engaging structure and the second engaging structure. The at least one elastic element is made of a soft material. Each of the at least one elastic element includes a hollow elastic wall and a hollow lower part. The corresponding hollow key frame is fixed on the hollow elastic wall. When each of the at least one keycap is detached from the corresponding hollow key frame, the corresponding hollow key frame is fixed on the hollow elastic wall.

In an embodiment, each of the at least one hollow key frame is made of polycarbonate, polyoxymethylene, aluminum alloy, aluminum magnesium alloy or zinc alloy.

In an embodiment, the hollow elastic wall of each of the at least one elastic element and the corresponding hollow key frame are combined together by using an embedding injection process, an embedding extrusion process, a double injection or a glue bonding process.

In an embodiment, the first engaging structure of each of the at least one keycap is a hook, and the second engaging structure of each of the at least one hollow key frame is a locking recess.

In an embodiment, each of the at least one hollow key frame further includes at least one bump structure, and the at least one bump structure is formed on a bottom edge of the corresponding hollow key frame.

In accordance with another aspect of the present invention, a see-through key module is provided. The see-through key module is installed on a display panel. The see-through key module includes at least one keycap, at least one elastic element, at least one hollow key frame and a switch circuit. Each of the at least one keycap is a hard structure. The at least one elastic element is made of a soft material. The at least one hollow key frame is previously fixed on the corresponding elastic element. Each of the at least one hollow key frame is arranged between the corresponding keycap and the corresponding elastic element. Each of the at least one hollow key frame is a hard structure. The switch circuit is arranged between the at least one elastic element and the display panel. While one of the at least one keycap is pressed down, the corresponding hollow key frame is moved downwardly to trigger the switch circuit.

In an embodiment, each of the at least one elastic element and the corresponding hollow key frame are combined together by using an embedding injection process, an embedding extrusion process, a double injection or a glue bonding process.

In accordance with another aspect of the present invention, a see-through key module is provided. The see-through key module is installed on a touch display panel. The see-through key module includes at least one keycap, at least one elastic element and at least one hollow key frame. Each of the at least one keycap is a hard structure. The at least one elastic element is made of a soft material. The at least one hollow key frame is previously fixed on the corresponding elastic element. Each of the at least one hollow key frame is arranged between the corresponding keycap and the corresponding elastic element. Each of the at least one hollow key frame is the hard structure. While one of the at least one keycap is pressed down, the corresponding hollow key frame is moved downwardly to trigger the touch display panel.

In an embodiment, each of the at least one elastic element and the corresponding hollow key frame are combined together by using an embedding injection process, an embedding extrusion process, a double injection or a glue bonding process.

In an embodiment, each of the at least one hollow key frame is made of polycarbonate, polyoxymethylene, aluminum alloy, aluminum magnesium alloy or zinc alloy.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. In the following embodiments and drawings, the elements irrelevant to the concepts of the present invention are omitted and not shown.

The present invention provides a see-through key module and a control device with the see-through key module.

Figure 1:
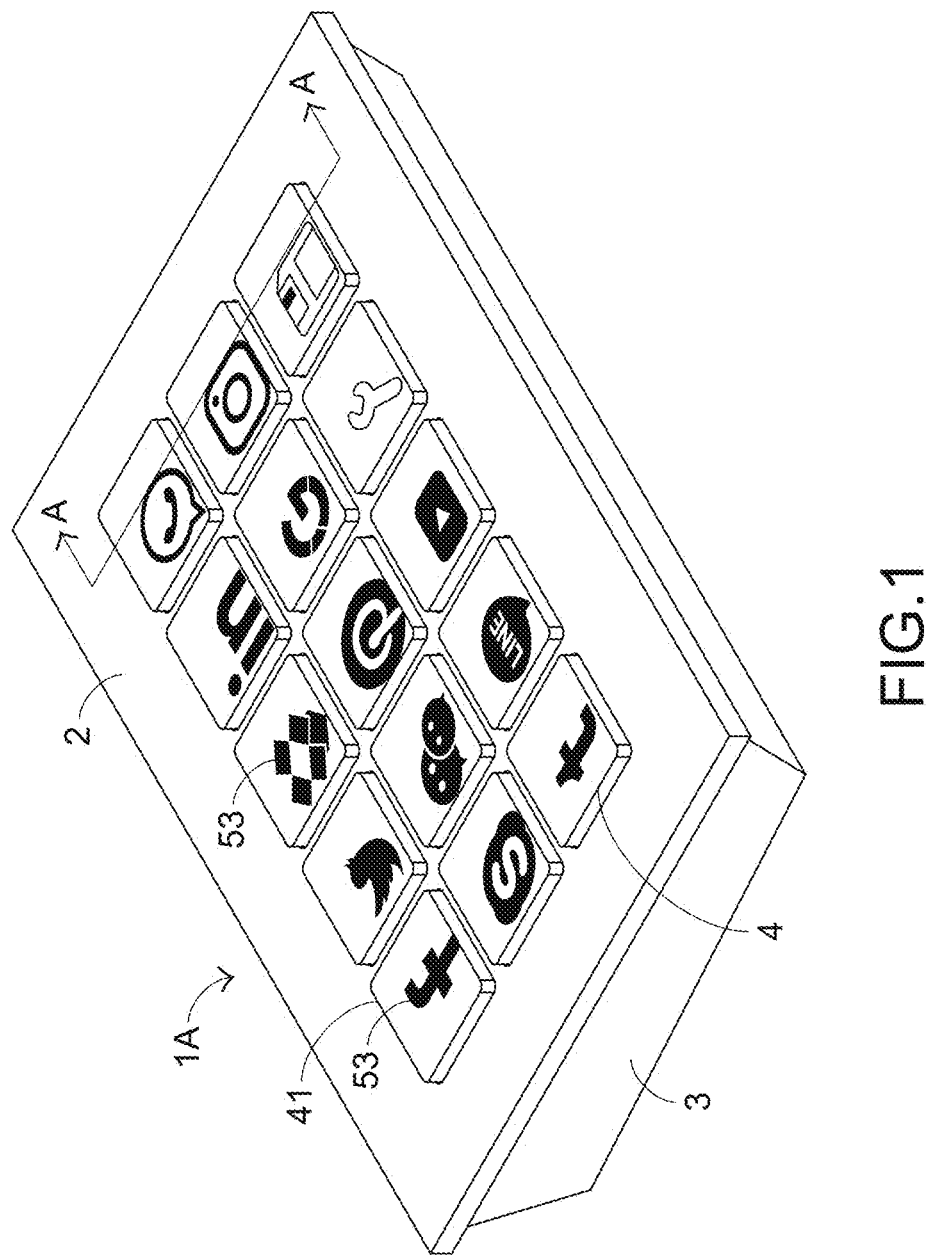
FIG. 1 is a schematic perspective view illustrating the assembled structure of a control device according to a first embodiment of the present invention.
Figure 2:
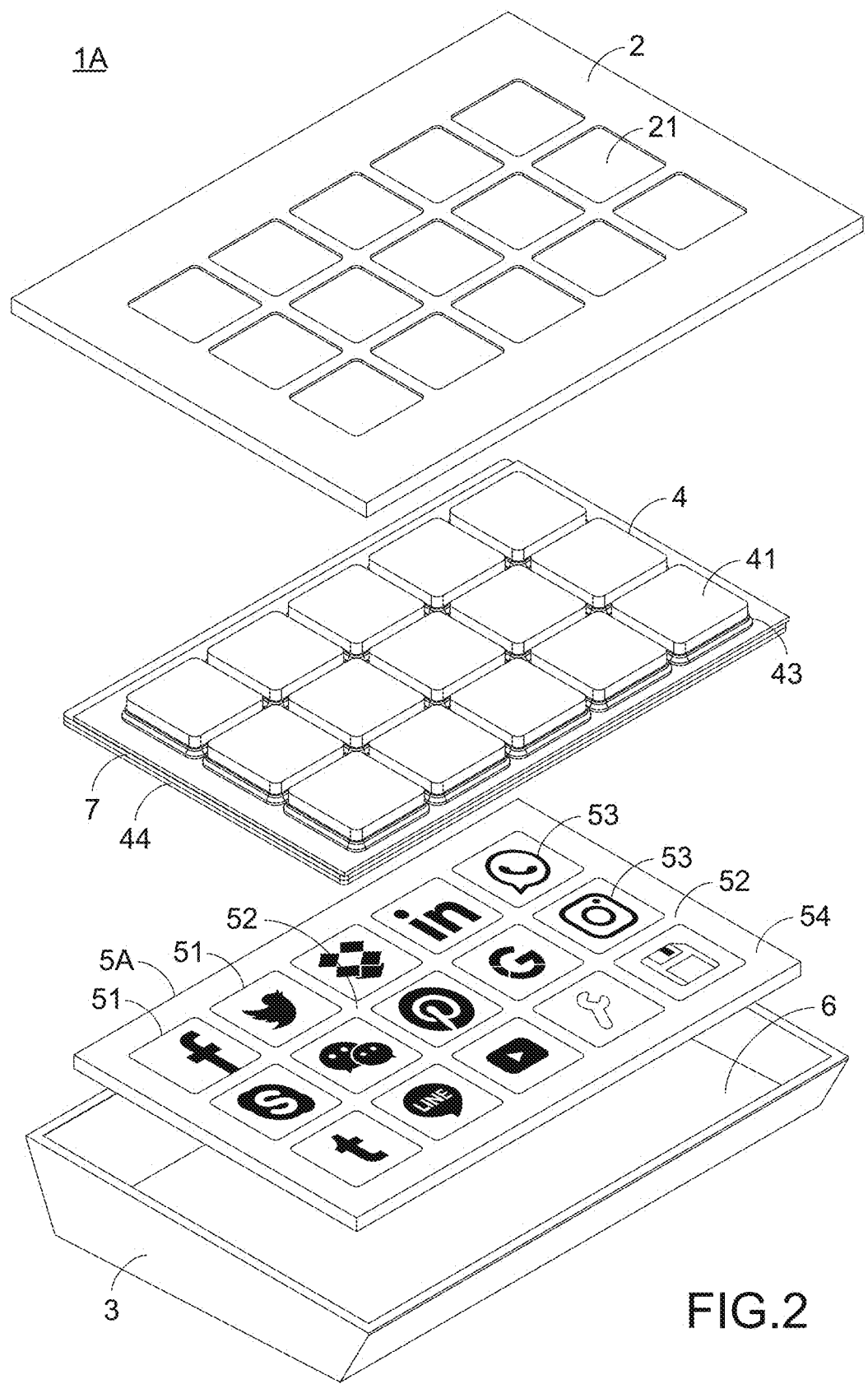
FIG. 2 is a schematic exploded view illustrating a portion of the control device as shown in FIG. 1.
Figure 3:
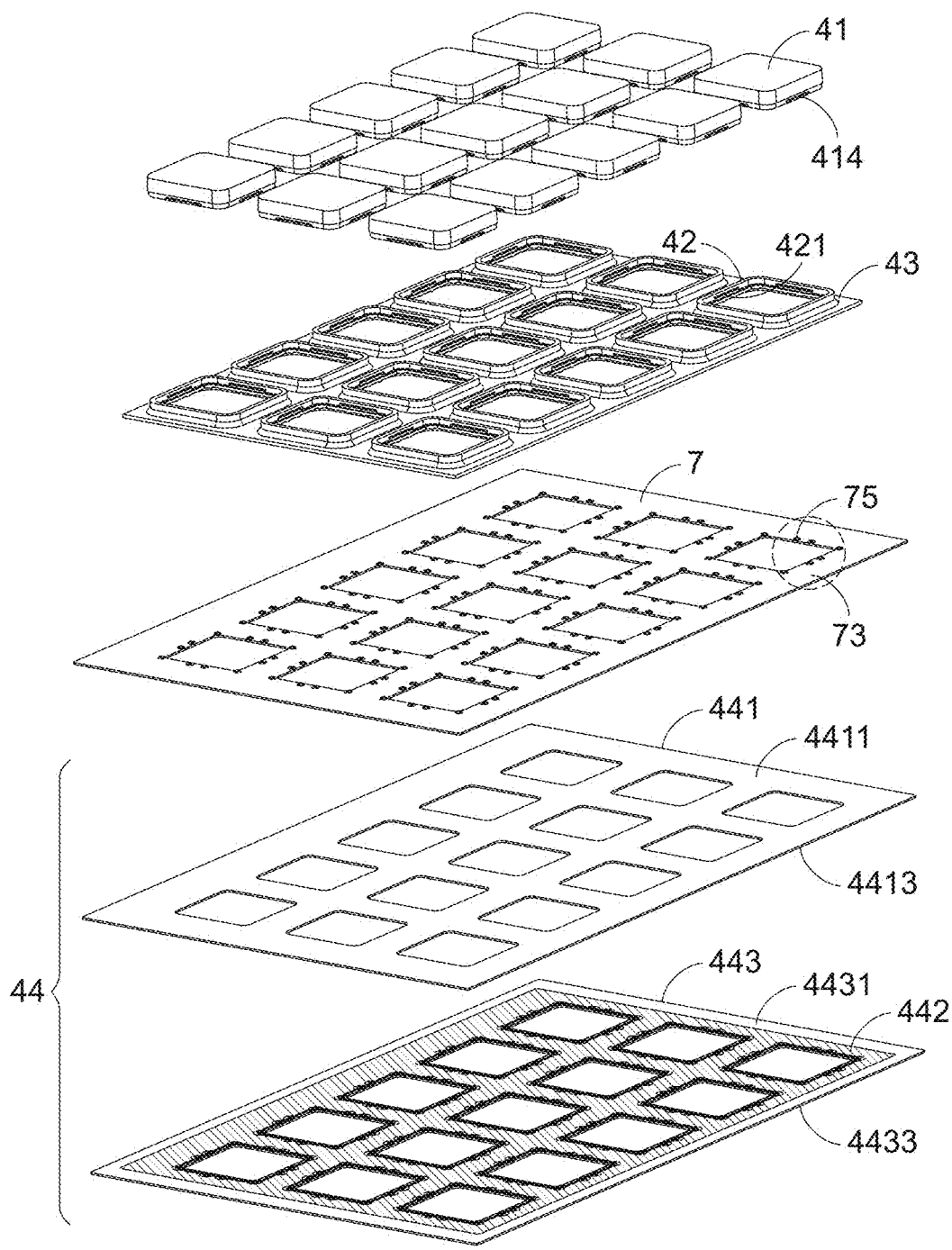
FIG. 3 is a schematic exploded view illustrating a see-through key module, a contact point layer and a switch circuit of the control device as shown in FIG. 2.
Figure 3A:
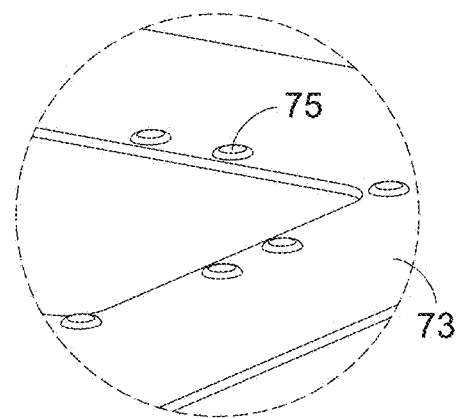
FIG. 3A is an enlarged portion of the top surface of the contact point layer showing at least one bump structure as shown in FIG. 3.
Figure 4:
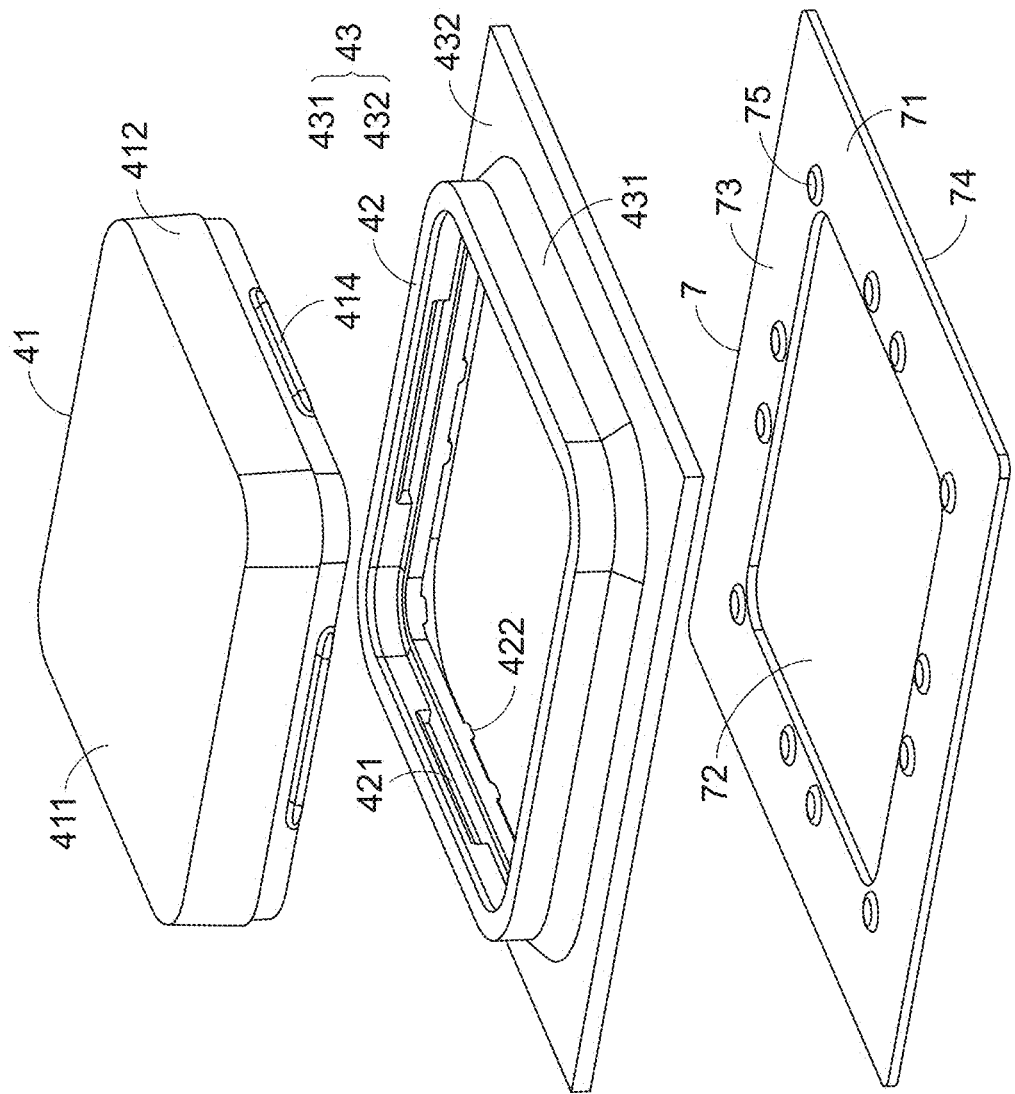
FIG. 4 is a schematic exploded view illustrating the relationship between the see-through key module and the contact point layer of the control device as shown in FIG. 3.
Figure 5:
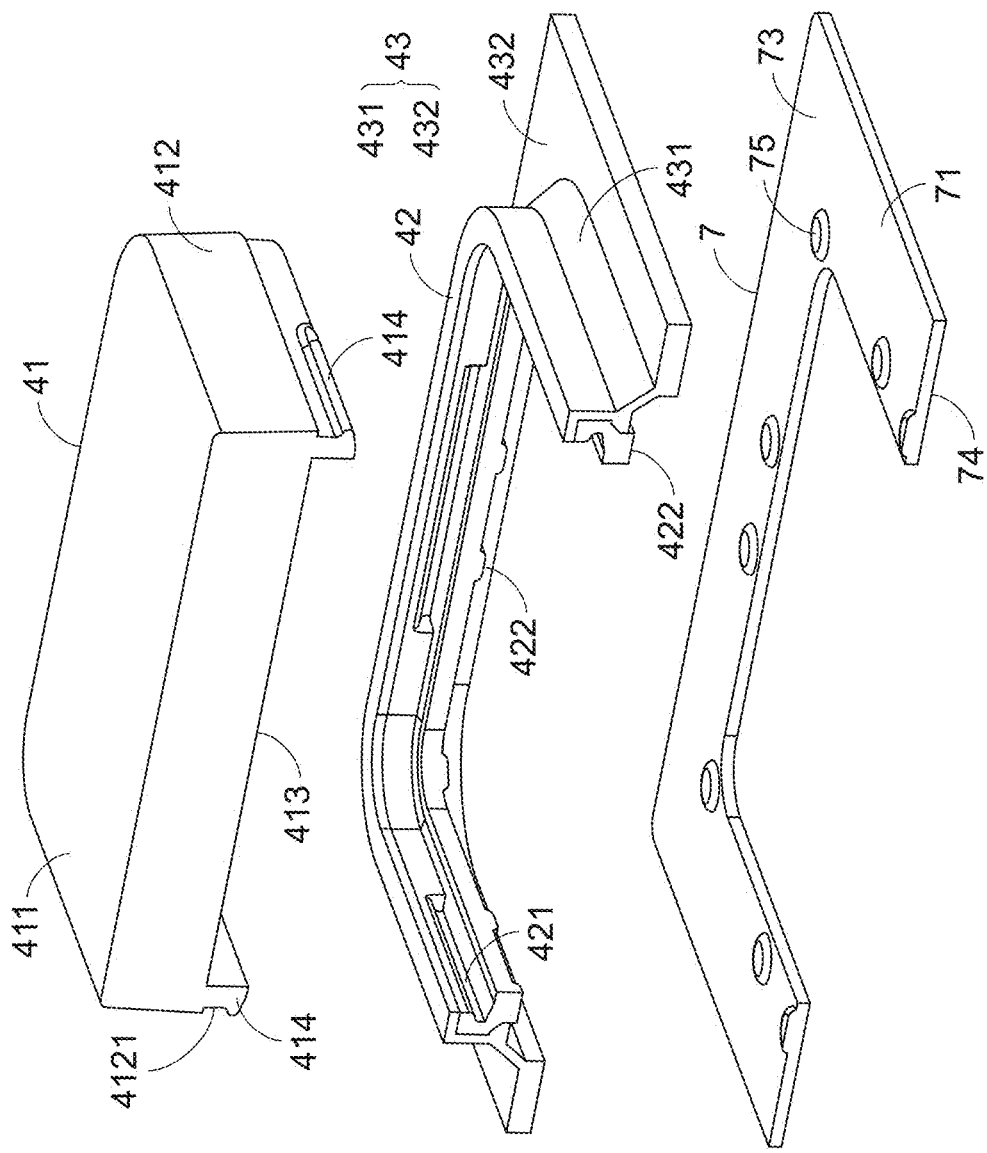
FIG. 5 is a schematic exploded and cutaway view illustrating the relationship between the see-through key module and the contact point layer of the control device as shown in FIG. 3 and taken along a viewpoint.
Figure 6:
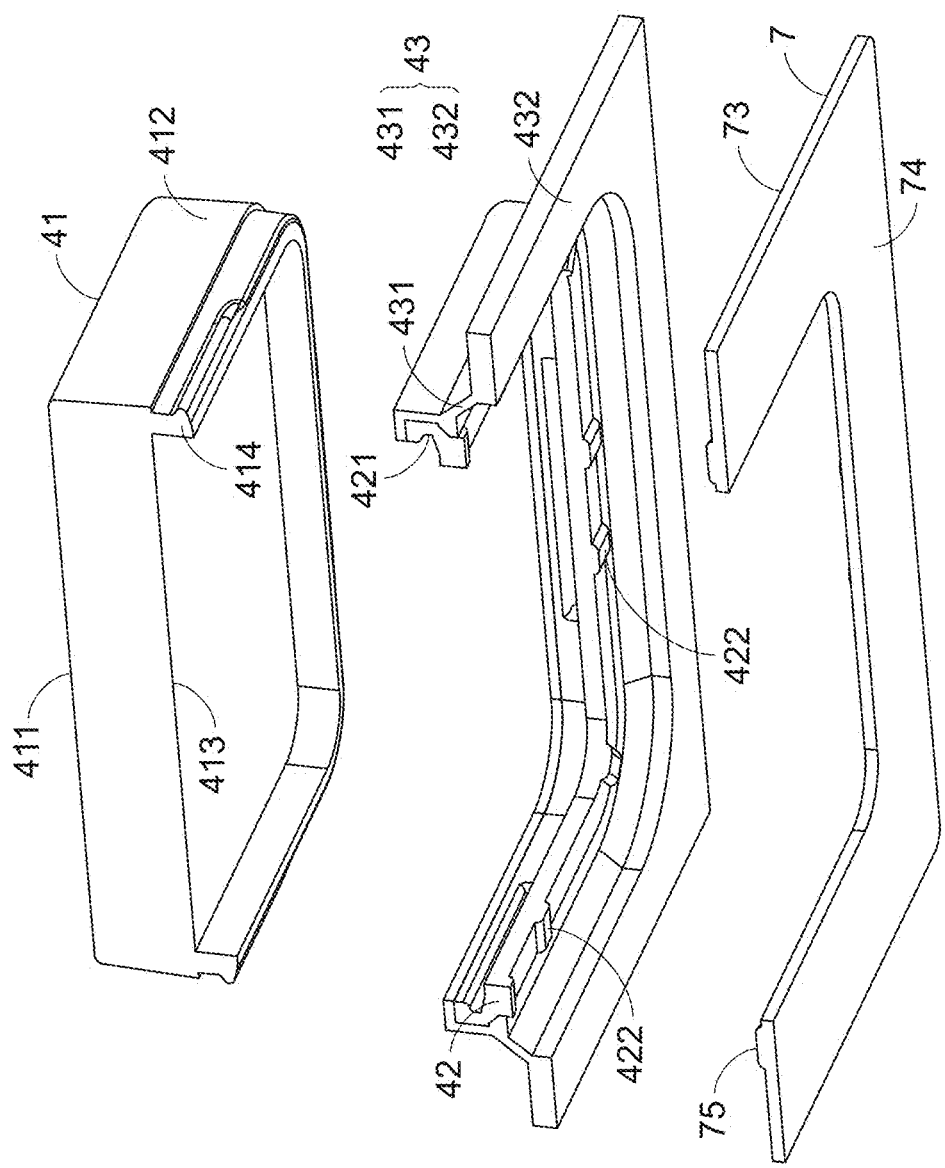
FIG. 6 is a schematic exploded and cutaway view illustrating the relationship between the see-through key module and the contact point layer of the control device as shown in FIG. 3 and taken along another viewpoint.
Figure 7:
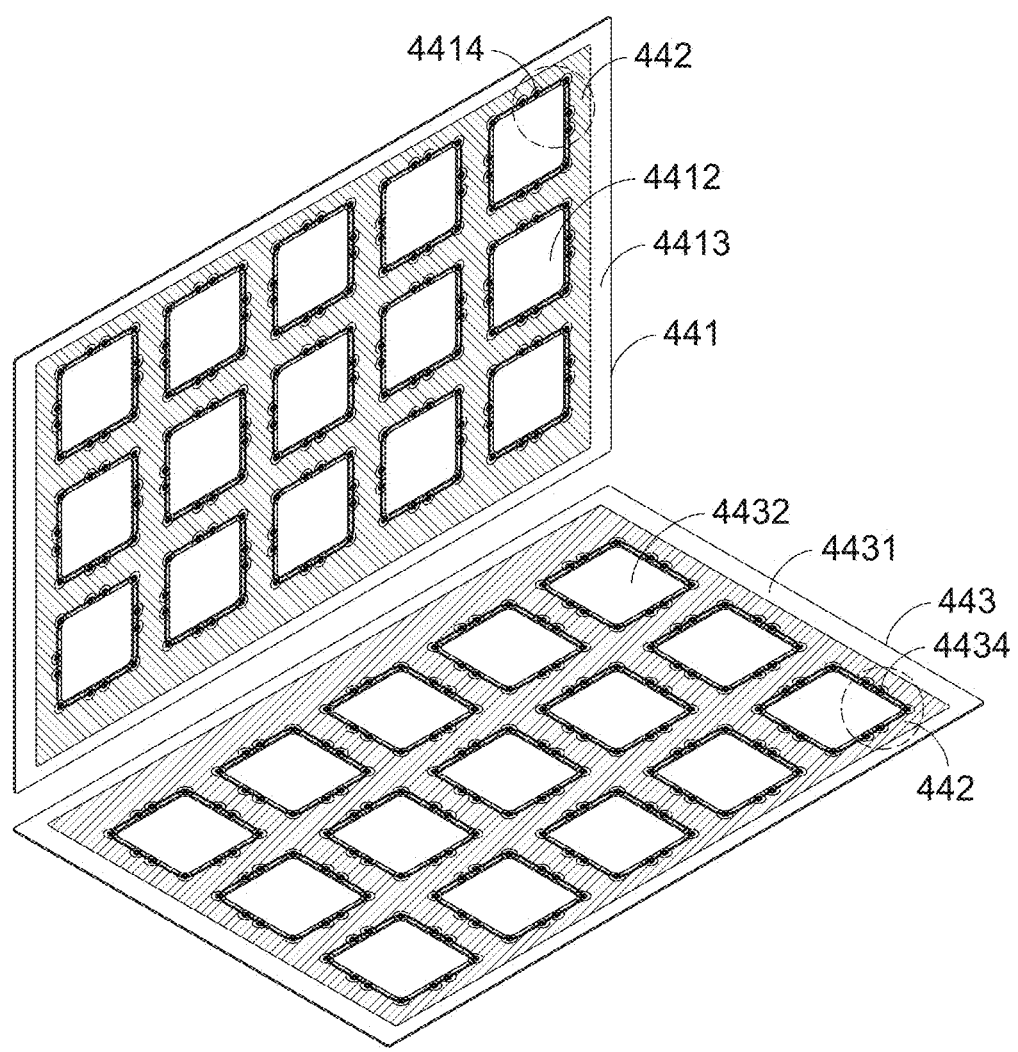
FIG. 7 is a schematic exploded view illustrating the switch circuit as shown in FIG. 3.
Figure 7A:
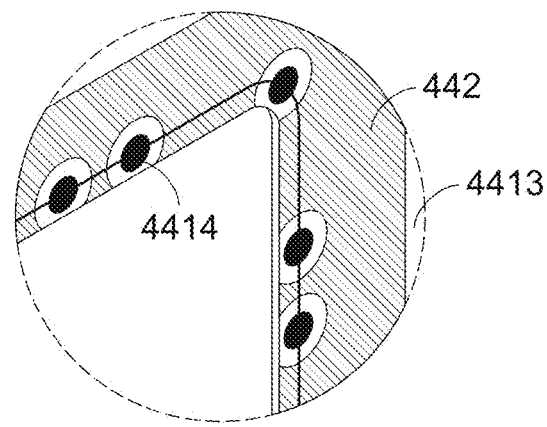
FIGS. 7A and 7B are enlarged portions of the switch circuit as shown in FIG. 7.
Figure 7B:
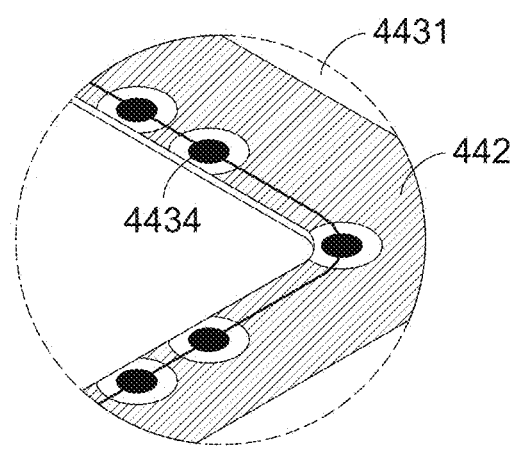
Figure 8:
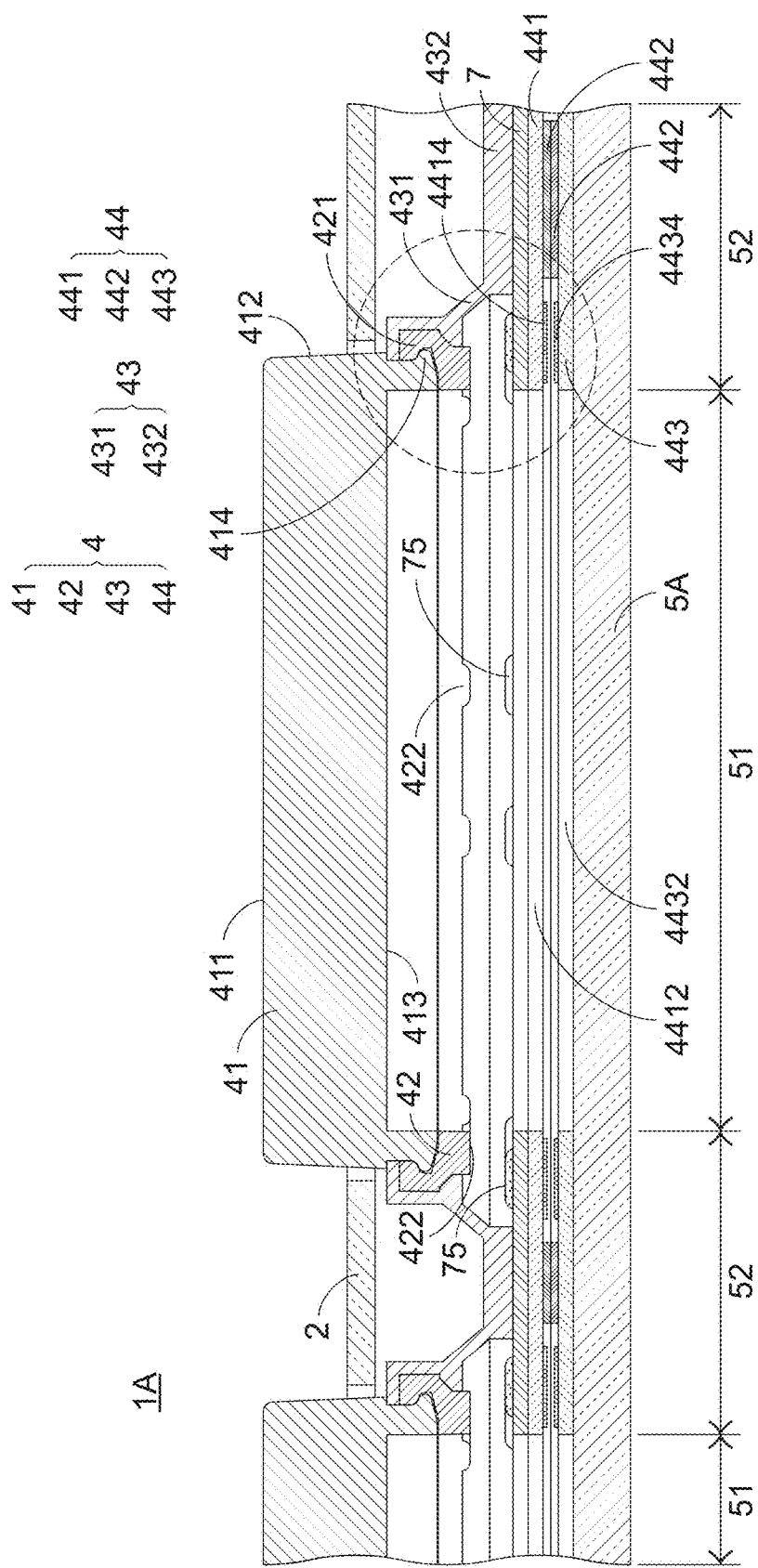
FIG. 8 is a schematic cross-sectional view illustrating the control device as shown in FIG. 1 and taken along the line A-A.
Figure 9:
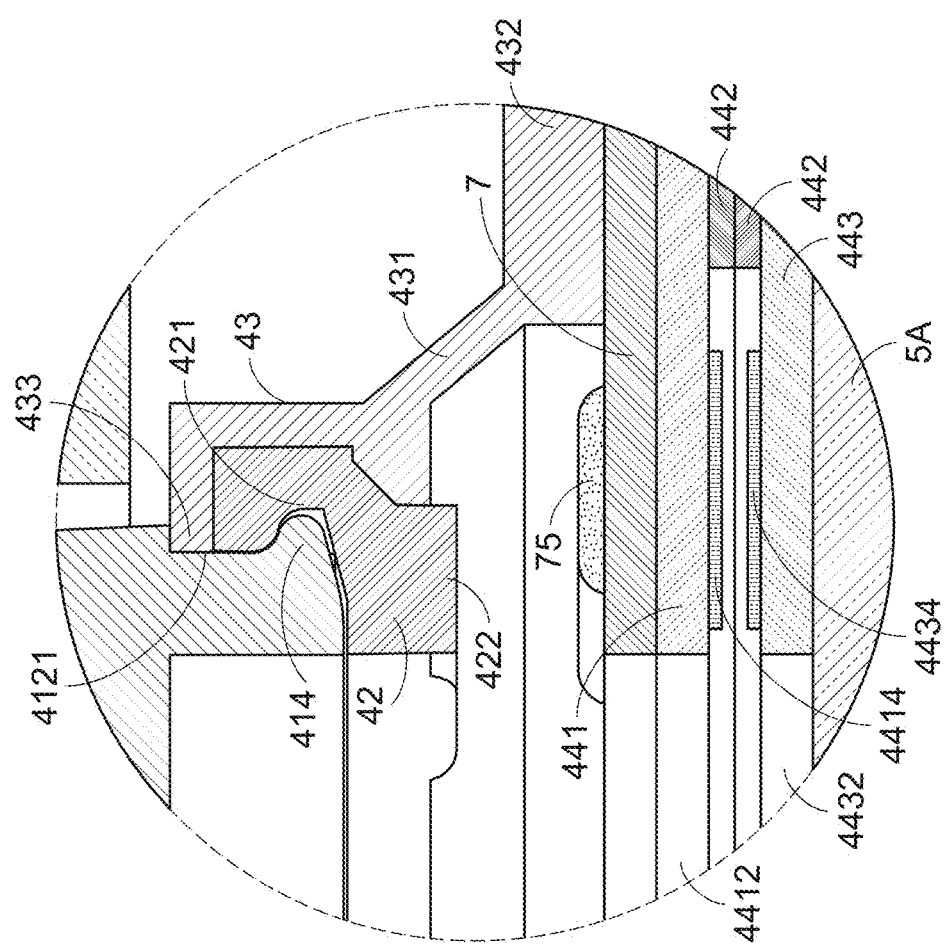
FIG. 9 is a schematic cross-sectional view illustrating an enlarged portion of the control device as shown in FIG. 8.

Please refer to FIGS. 1 to 9. FIG. 1 is a schematic perspective view illustrating the assembled structure of a control device according to a first embodiment of the present invention. FIG. 2 is a schematic exploded view illustrating a portion of the control device as shown in FIG. 1. FIG. 3 is a schematic exploded view illustrating a see-through key module, a contact point layer and a switch circuit of the control device as shown in FIG. 2. FIG. 4 is a schematic exploded view illustrating the relationship between the see-through key module and the contact point layer of the control device as shown in FIG. 3. FIG. 5 is a schematic exploded and cutaway view illustrating the relationship between the see-through key module and the contact point layer of the control device as shown in FIG. 3 and taken along a viewpoint. FIG. 6 is a schematic exploded and cutaway view illustrating the relationship between the see-through key module and the contact point layer of the control device as shown in FIG. 3 and taken along another viewpoint. FIG. 7 is a schematic exploded view illustrating the switch circuit as shown in FIG. 3. FIG. 8 is a schematic cross-sectional view illustrating the control device as shown in FIG. 1 and taken along the line A-A. FIG. 9 is a schematic cross-sectional view illustrating an enlarged portion of the control device as shown in FIG. 8.

In the first embodiment, the control device 1A is provided. The control device 1A can be applied to a live streaming controller, an ordering machine, an audio-visual streaming controller, an image editing controller, a peripheral device controller or a shortcut key controller.

In this embodiment, the control device 1A comprises a top cover 2, an outer casing 3, a see-through key module 4 and a display panel 5A.

The top cover 2 comprises at least one perforation 21. The position of each perforation 21 is aligned with the position of the corresponding keycap 41 of the see-through key module 4. In addition, the size of each perforation 21 matches the size of the corresponding keycap 41 of the see-through key module 4. Consequently, the keycap 41 can be exposed outside the corresponding perforation 21 in order to be pressed or operated by the user. In this embodiment, the top cover 2 comprises plural perforations 21. It is noted that the number of the perforations 21 is not restricted.

An accommodation space 6 is defined by the top cover 2 and the outer casing 3 collaboratively. The see-through key module 4 and the display panel 5A are disposed within the accommodation space 6. Optionally, a processor, a signal processing device and a communication interface are disposed within the control device 1A. The processor, the signal processing device and the communication interface are in communication with the see-through key module 4 and the display panel 5A.

The see-through key module 4 comprises at least one keycap 41, at least one hollow key frame 42, at least one elastic element 43 and a switch circuit 44. Each keycap 41 is aligned with the corresponding hollow key frame 42 and the corresponding elastic element 43 along the vertical direction. In this embodiment, the see-through key module 4 comprises plural keycaps 41 and plural hollow key frames 42. It is noted that the number of the keycaps 41 and the number of the hollow key frames 42 are not restricted.

In an embodiment, the keycap 41 comprises a press part 411, a lateral wall 412 and a bottom surface 413. The lateral wall 412 is arranged between the press part 411 and the bottom surface 413. The keycap 41 is a light-transmissible keycap. For example, the keycap 41 is fully transparent or translucent. Consequently, the light beam generated by the display panel 5A (e.g., the graphic image shown on the display panel 5A) can be transmitted upwardly through the keycap 41 so as to be viewed by the user. Moreover, the keycap 41 is made of a hard material. Consequently, when the keycap 41 is pressed by the user, the keycap 41 is not subjected to deformation.

In an embodiment, the keycap 41 further comprises at least one engaging structure 414. For example, the at least one engaging structure 414 includes four engaging structures 414. For example, the four engaging structure 414 are respectively four hook structures, which are formed on the lateral wall 412. Moreover, four concave structures 4121 are formed in the lateral wall 412 of the keycap 41. The four concave structures 4121 are respectively located over the four engaging structures 414.

The hollow key frame 42 is previously fixed and formed on the corresponding elastic element 43. After the hollow key frame 42 and the corresponding keycap 41 are assembled with each other, the hollow key frame 42 is arranged between the corresponding keycap 41 and the corresponding elastic element 43. The hollow key frame 42 is a hard structure that is made of engineering plastic material or environmentally friendly plastic material such as polycarbonate (PC) or polyoxymethylene (POM). Alternatively, the hollow key frame 42 is made of metallic material such as aluminum alloy, aluminum magnesium alloy or zinc alloy. The hollow key frame 42 comprises at least one engaging structure 421. As shown in FIGS. 4, 5 and 6, the at least one engaging structure 421 includes four engaging structures 421. Moreover, the four engaging structures 421 are respectively four locking recesses, which are formed in an inner side of the hollow key frame 42.

In this embodiment, the keycap 41 and the hollow key frame 42 are detached from each other, or the keycap 41 and the hollow key frame 42 are combined together through the engagement between the at least one engaging structure 411 of the keycap 41 and the corresponding engaging structure 421 of the hollow key frame 42. Consequently, when the keycap 41 is damaged, the damaged keycap 41 can be repaired and replaced separately. That is, it is not necessary to replace the whole see-through key module 4. Furthermore, the original keycap 41 can be replaced with a special keycap. For example, the surface of the special keycap has a braille structure. Alternatively, the original keycap 41 can be replaced with any other appropriate keycap with a different color, a different shape or a different structure. Consequently, the keycap can meet the needs of different consumers.

The elastic element 43 is a soft structure with the soft elastic property. The elastic element 43 provides an elastic force for moving upwardly and downwardly the keycap 41 in a reciprocating manner. In an embodiment, the elastic element 43 comprises a hollow elastic wall 431 and a hollow lower part 432. The hollow elastic wall 431 and the hollow lower part 432 are collaboratively formed as an approximately rectangular, circular or trapezoidal crater structure in appearance. In addition, the center region of the crater structure is hollow. Consequently, the light beam generated by the display panel 5A (e.g., the graphic image shown on the display panel 5A) can be directly and upwardly transmitted through the hollow elastic wall 431 and the hollow lower part 432 of the elastic element 43 without hindrance and then projected upwardly to the keycap 41. The hollow elastic wall 431 of the elastic element 43 is connected with the hollow key frame 42 to support the hollow key frame 42. Since the center region of the hollow key frame 42 is also hollow, the light beam generated by the display panel 5A will not be obstructed by the hollow key frame 42.

As mentioned above, the elastic element 43 comprises the hollow elastic wall 431 and the hollow lower part 432. As shown in FIG. 3, the elastic element 43 further comprises a coupling part 433. The hollow key frame 42 is fixed on and combined with the hollow elastic wall 431 of the elastic element 43. In an embodiment, the hollow elastic wall 431 of the elastic element 43 and the hollow key frame 42 are previously combined with each other by using an embedding injection process, an embedding extrusion process, a double injection or a glue bonding process. Furthermore, when the keycap 41 and the hollow key frame 42 are detached from each other, the hollow key frame 42 is still fixed on the hollow elastic wall 431 of the elastic element 43. In other words, even if the keycap 41 is detached, the hollow key frame 42 and the elastic element 43 are still combined together.

When the keycap 41 and the hollow key frame 42 are combined together, the coupling part 433 is inserted into the at least one concave structure 4121 in the lateral wall 412 of the keycap 41 and closely contacted with the at least one concave structure 4121. Due to this structural design, the airtightness between the keycap 41 and the elastic element 43 will be enhanced, and the tight combination between the at least one engaging structure 414 of the keycap 41 and the corresponding engaging structure 421 of the hollow key frame 42 can be achieved.

The hollow elastic wall 431 is arranged between the hollow key frame 42 and the hollow lower part 432 of the elastic element 43. The hollow elastic wall 431 can be subjected to deformation and returned to its original position. That is, the hollow elastic wall 431 is bendable or compressible.

In an embodiment, the elastic element 43 comprises at least one hollow elastic wall 431 and at least one hollow lower part 432. For example, the elastic element 43 comprises plural hollow elastic walls 431 and plural hollow lower parts 432. In addition, the adjacent hollow lower parts 432 are connected with each other. Consequently, the elastic element 43 is integrated into a one-piece film structure. It is noted that numerous modifications may be made while retaining the teachings of the present invention. For example, in another embodiment, the adjacent hollow lower parts 432 are separated from each other.

A display region of the display panel 5A is divided into at least one sub-display region 51 and at least one background region 52. The area of the display panel 5A excluding the background region 52 is the at least one sub-display region 51. Every two adjacent sub-display regions 51 are separated from each other by the corresponding background region 52. Consequently, there is a clearer boundary between every two adjacent sub-display regions 51.

According to the predetermined setting or control, a graphic image 53 is outputted from or shown on the at least one sub-display region 51 of the display panel 5A. The graphic image 53 contains a specified image, information or picture. That is, the graphic image 53 is not purely the backlight light. The display panel 5A is different from the backlight mechanism of the conventional backlight keyboard. Moreover, the graphic image 53 can be set, controlled or replaced by the user. A non-graphic image 54 is shown on the at least one background region 52 of the display panel 5A. For example, the non-graphic image 54 is a background color image or an opaque region without any image.

In the above embodiment, the display panel 5A comprises plural sub-display regions 51 and one background region 52. It is noted that the number of the at least one sub-display region 51 and the number of the at least one background region 52 are not restricted.

In the control device 1A of the first embodiment, the see-through key module 4 is located over the display panel 5A. Moreover, the non-graphic image 54 is shaded by the see-through key module 4 along the vertical direction, but the graphic image 53 is exposed through the see-through key module 4. The elastic element 43 is made of a dark color material or a black material. Consequently, the underlying background region 52 of the display panel 5A or the non-graphic image 54 shown on the at least one background region 52 will be shaded by the hollow lower part 432 of the corresponding elastic element 43. Consequently, the graphic images 53 outputted from all sub-display regions 51 of the display panel 5A can be individually and visually recognized by the user. That is, the adjacent graphic images 53 will not be interfered by each other. Consequently, the graphic images 53 outputted from the corresponding sub-display regions 51 of the display panel 5A can be exposed through the hollow lower parts 432 of the elastic element 43, the corresponding hollow elastic walls 431 of the elastic element 43, the hollow key frames 42 and the corresponding keycaps 41 and directly viewed by the user.

In an embodiment, the display panel to cooperatively work with the see-through key module 4 is a display panel with the displaying function only. For example, the display panel 5A is a liquid crystal display (LCD) panel, an organic light emitting diode (OLED) panel, an electrophoretic display (EPD) panel or a cholesteric liquid crystal display (ChLCD) panel. Alternatively, the display panel is a touch display panel with a touch input function. For example, the display panel is a resistive touch display panel or a capacitive touch display panel.

In the control device 1A of the first embodiment, the display panel 5A is the display panel with the displaying function only. The display panel 5A cooperatively works with the see-through key module 4. Consequently, the control device 1A is additionally equipped with the switch circuit 44 between the hollow lower parts 432 of the see-through key module 4 and the display panel 5A. By the switch circuit 44, the pressing action of the user can be converted into a pressing signal. In addition, the pressing signal is transmitted to a control circuit of the control device 1A or a main board.

In an embodiment, the switch circuit 44 comprises an upper film layer 441, a spacer structure and a lower film layer 443.

The upper film layer 441 comprises a top surface 4411, at least one light-transmissible opening 4412 and a bottom surface 4413. The at least one light-transmissible opening 4412 of the upper film layer 441 is arranged between the top surface 4411 of the upper film layer 441 and the bottom surface 4413 of the upper film layer 441. The bottom surface 4413 of the upper film layer 441 faces the lower film layer 443.

The lower film layer 443 comprises a top surface 4431, at least one light-transmissible opening 4432 and a bottom surface 4433. The at least one light-transmissible opening 4432 of the lower film layer 443 is arranged between the top surface 4431 of the lower film layer 443 and the bottom surface 4433 of the lower film layer 443. The top surface 4431 of the lower film layer 443 faces the upper film layer 441.

After the graphic image 53 shown on the display panel 5A is transmitted upwardly through the at least one light-transmissible opening 4432 of the lower film layer 443 and the at least one light-transmissible opening 4412 of the upper film layer 441, the graphic image 53 is transmitted through the corresponding elastic element 43, the corresponding hollow key frame 42 and the corresponding keycaps 41 so as to be viewed by the user.

The spacer structure is arranged between the bottom surface 4413 of the upper film layer 441 and the top surface 4431 of the lower film layer 443. In addition, the upper film layer 441 and the lower film layer 443 are separated from each other by the spacer structure.

In the above embodiment, the upper film layer 441 comprises plural light-transmissible openings 4412, and the lower film layer 443 comprises plural light-transmissible openings 4432. It is noted that the numbers of the light-transmissible openings 4412 and 4432 are not restricted.

In an embodiment, the spacer structure comprises at least one ink structure 442. For example, the spacer structure comprises two ink structures 442, and each of the two ink structures 442 is a printing ink structure, a thermal baking ink structure, a quick drying ink structure or a moisture curing ink structure. One of the two ink structures 442 is formed on the bottom surface 4413 of the upper film layer 441, and the other of the two ink structures 442 is formed on the top surface 4431 of the lower film layer 443. In addition, the ink structure 442 is located near the circuit contact points 4414 of the upper film layer 441 or the circuit contact points 4434 of the lower film layer 443. Consequently, the circuit contact points 4414 of the upper film layer 441 and the circuit contact points 4434 of the lower film layer 443 are separated from each other.

Especially, the ink structure 442 can be formed in the proper vacant regions of the narrow space or layout range. Consequently, the ink structure 442 is suitable for the upper film layer 441 and the lower film layer 443 with the light-transmissible openings 4412 and 4432. In addition, the aligning and assembling complexity of the switch circuit 44 can be largely reduced.

In the above embodiment, the ink structure 442 is formed and cured on the bottom surface 4413 of the upper film layer 441 individually, or the ink structure 442 is cured and formed on the top surface 4431 of the lower film layer 443 individually. The ink structure 442 may have a dot shape, a strip shape, a cross shape, a geometric shape, an irregular shape, a continuous shape or a discontinuous shape.

The upper film layer 441 comprises at least one circuit contact point 4414, and the at least one circuit contact point 4414 is formed on the bottom surface 4413 of the upper film layer 441. The lower film layer 443 comprises at least one circuit contact point 4434, and the at least one circuit contact point 4434 is formed on the top surface 4431 of the lower film layer 443. The at least one circuit contact point 4414 of the upper film layer 441 and the corresponding circuit contact point 4434 of the lower film layer 443 are overlapped with each other along the vertical direction. In addition, the at least one circuit contact point 4414 of the upper film layer 441 and the corresponding circuit contact point 4434 of the lower film layer 443 are separated from each other through the spacer layer (e.g., the ink structure 442).

In case that the switch circuit 44 is not triggered or pressed, each circuit contact point 4414 and the corresponding circuit contact point 4434 are separated from each other by the spacer layer (e.g., the ink structure 442). That is, there is a distance between each circuit contact point 4414 and the corresponding circuit contact point 4434.

As the switch circuit 44 is pressed, the circuit contact point 4414 of the upper film layer 441 corresponding to the pressed position is moved downwardly. When the circuit contact point 4414 of the upper film layer 441 is contacted with the corresponding circuit contact point 4434 of the lower film layer 443, the switch circuit 44 issues the pressing signal. The pressing signal is transmitted to the control circuit of the control device 1A or the main board.

The at least one circuit contact point 4414 of the upper film layer 441 is located near the corresponding light-transmissible opening 4412. In addition, the adjacent circuit contact points 4414 are connected with each other through a conducting line. Similarly, the at least one circuit contact point 4434 of the lower film layer 443 is located near the corresponding light-transmissible opening 4432. In addition, the adjacent circuit contact points 4434 are connected with each other through a conducting line.

In the control device 1A of this embodiment, the underlying switch circuit 44 is triggered through the hollow key frame 42. Consequently, the hollow key frame 42 and the corresponding circuit contact point 4414 of the upper film layer 441 are overlapped with each other along the vertical direction. Similarly, the hollow key frame 42 and the corresponding circuit contact point 4434 of the lower film layer 443 are overlapped with each other along the vertical direction. Consequently, when the keycap 41 is pressed by the user, the pressing force is transmitted from the keycap 41 to the corresponding hollow key frame 42. Then, in response to the pressing force, the hollow key frame 42 is moved downwardly and contacted with the upper film layer 441. When the circuit contact point 4414 of the upper film layer 441 is contacted with the corresponding circuit contact point 4434 of the lower film layer 443, the switch circuit 44 issues the pressing signal. Since the keycap 41 and the hollow key frame 42 are hard structures, the pressing force applied by the user can be effectively and accurately transmitted from the keycap 41 and the hollow key frame 42 to the underlying switch circuit 44. Consequently, the pressing signal can be outputted instantly.

In order to trigger the switch circuit 44 more accurately, the control device 1A is additionally equipped with plural bump structures 422. The bump structures 422 are formed on a bottom edge of the corresponding hollow key frame 42. That is, the bump structures 422 are formed on the side of the corresponding hollow key frame 42 that faces the switch circuit 44. The bump structure 422, the corresponding circuit contact point 4414 of the upper film layer 441 and the corresponding circuit contact point 4434 of the lower film layer 443 are overlapped with each other along the vertical direction. Due to the arrangement of the bump structures 422, the switch circuit 44 can be triggered more smoothly when the control device 1A is operated by the user.

Optionally, the control device 1A is further equipped with a contact point layer between the elastic element 43 and the switch circuit 44. Please refer to FIGS. 2 to 9 again. In the control device 1A of the first embodiment, the contact point layer 7 is selectively arranged between the see-through key module 4 and the upper film layer 441 of the switch circuit 44. In some other embodiments, the contact point layer 7 is omitted. That is, the underlying switch circuit 44 is directly triggered through the bump structures 422, which are formed on the bottom edge of the corresponding hollow key frame 42.

The contact point layer 7 comprises a contact point region 71 and a light-transmissible region 72. The non-graphic image 54 of the display panel 5A is covered by the contact point region 71 along the vertical direction. The graphic image 53 of the display panel 5A is exposed through the light-transmissible region 72 along the vertical direction. In an embodiment, the light-transmissible region 72 is a hollow structure that allows the underlying light beam to pass through. Alternatively, the light-transmissible region 72 is a light-transmissible film layer that allows the underlying light beam to pass through. For illustration, the light-transmissible region 72 of this embodiment is a hollow structure.

In an embodiment, the contact point layer 7 comprises a top surface 73, a bottom surface 74 and at least one bump structure 75. The at least one bump structure 75 is formed on the top surface 73 of the contact point layer 7 for facilitating the user to trigger the corresponding contact point of the underlying switch circuit 44. The at least one bump structure 75 of the contact point layer 7, the corresponding circuit contact point 4414 of the upper film layer 441 and the corresponding circuit contact point 4434 of the lower film layer 443 are overlapped with each other along the vertical direction. In an embodiment, the at least one bump structure 75 is formed on the top surface 73 of the contact point layer 7 by using an attaching process, a printing process, a coating process or a glue dispensing process. In another embodiment, the at least one bump structure 75 is integrally formed with the contact point layer 7. That is, during the process of forming or producing the contact point layer 7, the at least one bump structure 75 is formed simultaneously. In addition, the bump structure 75 is made of rubber, epoxy resin, polyester plastic material, light curable material, moisture curing material or thermosetting material.

Figure 10:
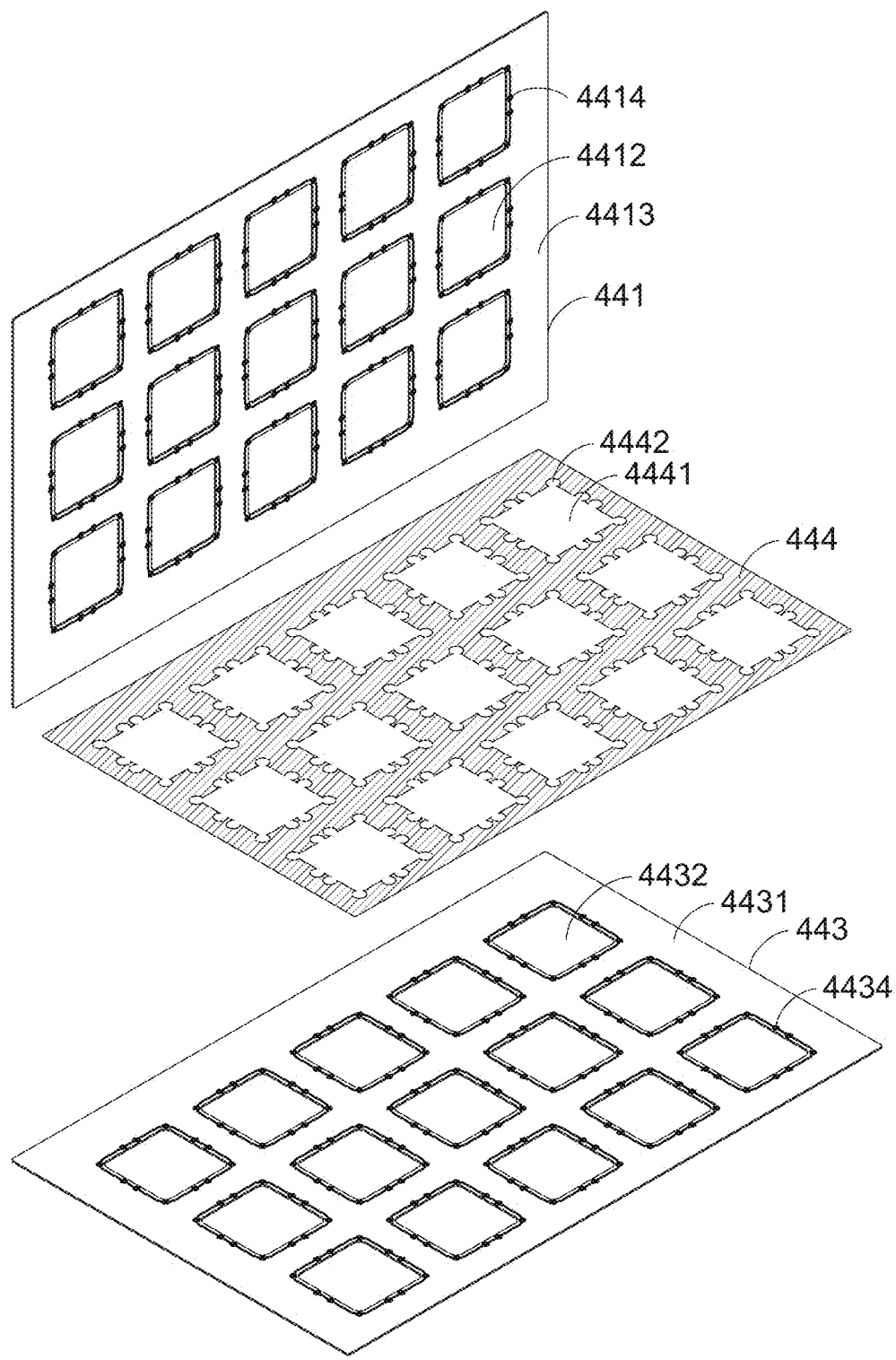
FIG. 10 is a schematic exploded view illustrating a variant example of the switch circuit in the control device according to the first embodiment of the present invention, in which the spacer structure comprises a separation film layer.
Figure 11:
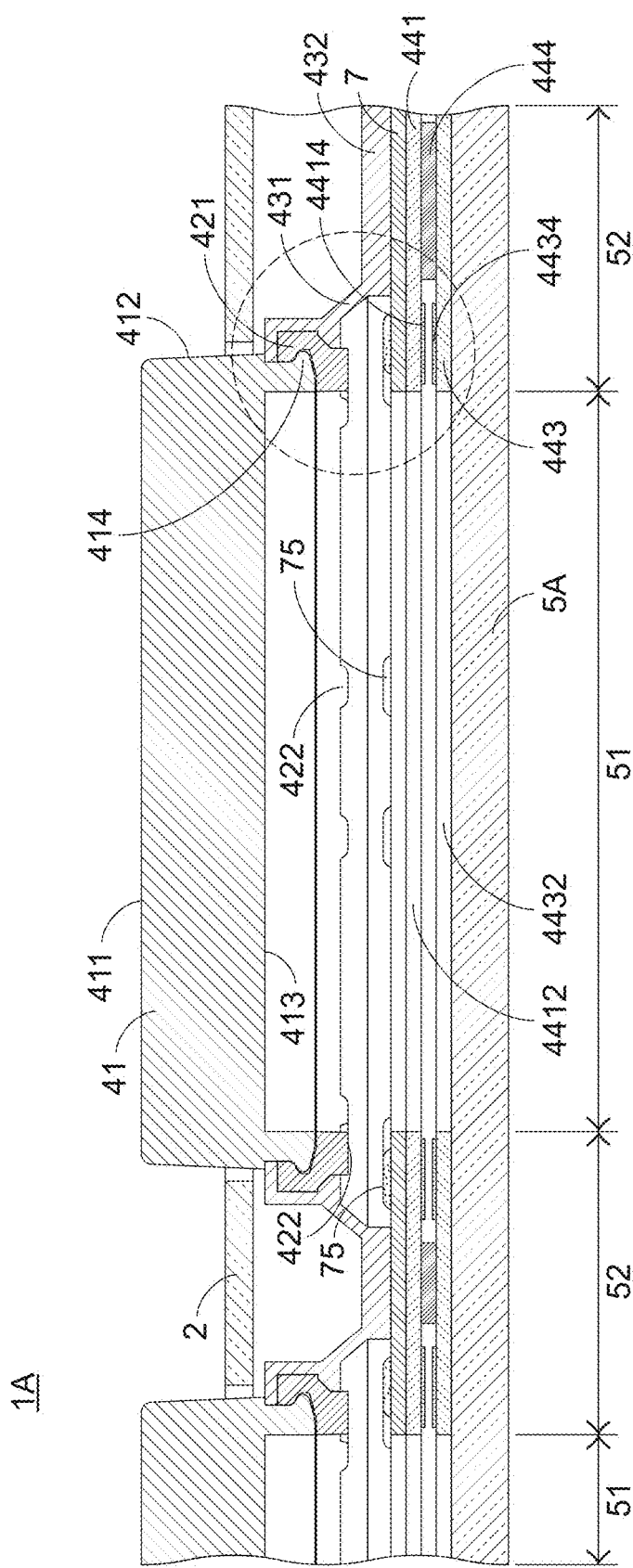
FIG. 11 is a schematic cross-sectional view illustrating the control device with the switch circuit shown in FIG. 10.

In the above embodiment, the spacer structure comprises at least one ink structure 442. It is noted that the example of the spacer structure is not restricted. FIG. 10 is a schematic exploded view illustrating a variant example of the switch circuit in the control device according to the first embodiment of the present invention, in which the spacer structure comprises a separation film layer. FIG. 11 is a schematic cross-sectional view illustrating the control device with the switch circuit shown in FIG. 10. In a variant example, the spacer structure comprises a separation film layer 444. The separation film layer 444 comprises at least one light-transmissible opening 4441 and at least one indented region 4442. The at least one light-transmissible opening 4412 of the upper film layer 441, the corresponding light-transmissible opening 4432 of the lower film layer 443 and the corresponding light-transmissible opening 4441 of the separation film layer 444 are overlapped with each other along the vertical direction. In addition, the at least one circuit contact point 4414 of the upper film layer 441, the corresponding indented region 4442 of the separation film layer 444 and the corresponding circuit contact point 4434 of the lower film layer 443 are overlapped with each other along the vertical direction.

Like the first embodiment, in case that the display panel has the displaying function only and the display panel cooperatively works with the see-through key module 4, the control device 1A is additionally equipped with the switch circuit 44 under the hollow lower parts 432 of the see-through key module 4. Furthermore, the switch circuit 44 can recognize which keycap 41 is pressed or triggered by the user. Consequently, the control device 1A issues or executes a control signal or a command corresponding to the graphic image 53 under the keycap 41. In case that the display panel is a touch display panel and the display panel cooperatively works with the see-through key module 4, the pressing action performed on a specified keycap 41 of the see-through key module 4 can trigger the underlying touch display panel. Consequently, the control device 1A issues or executes a control signal or a command corresponding to the graphic image 53 under the keycap 41.

Figure 12:
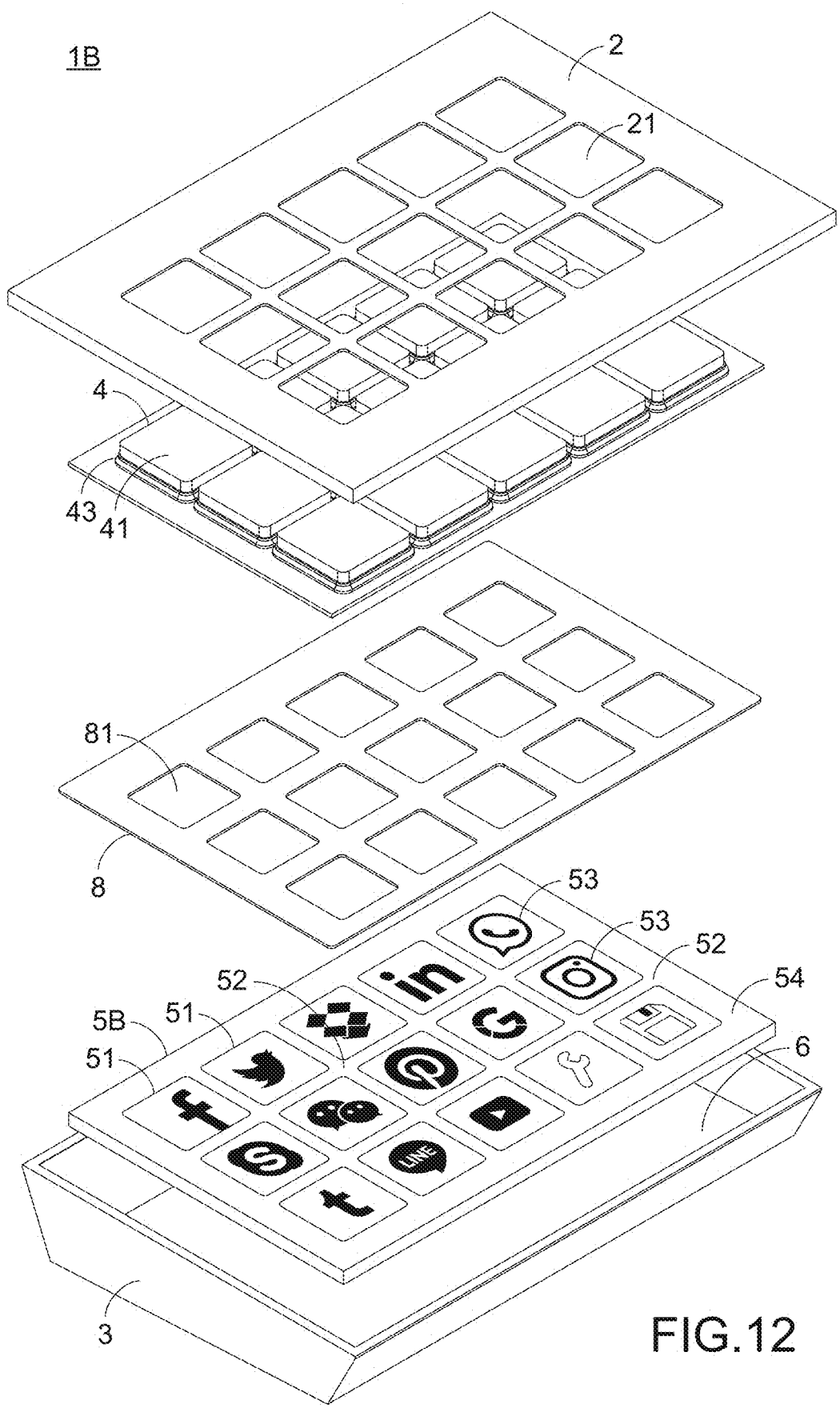
FIG. 12 is a schematic exploded view illustrating a portion of a control device according to a second embodiment of the present invention.
Figure 13:
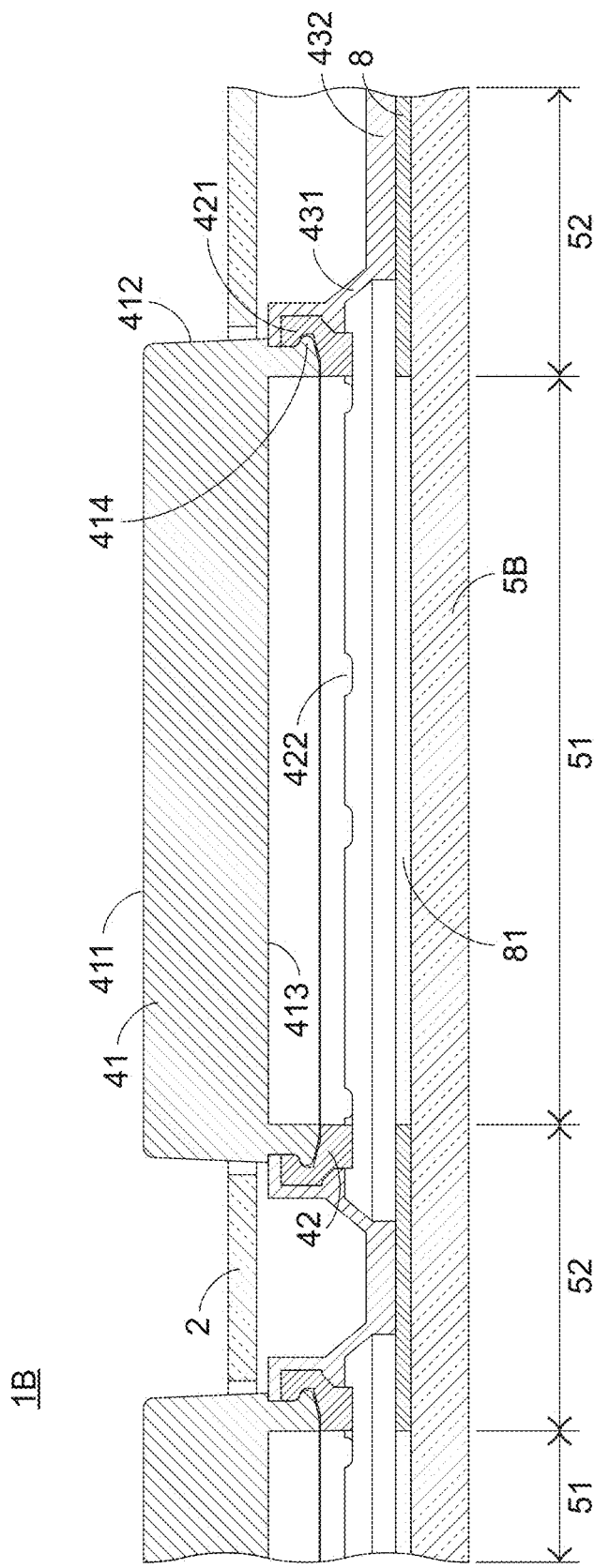
FIG. 13 is a schematic cross-sectional view illustrating the control device as shown in FIG. 12.

FIG. 12 is a schematic exploded view illustrating a portion of a control device according to a second embodiment of the present invention. FIG. 13 is a schematic cross-sectional view illustrating the control device as shown in FIG. 12. In comparison with the control device 1A of the first embodiment, the display panel 5B in the control device 1B of this embodiment is a touch display panel. In addition, the touch display panel 5B cooperatively works with the see-through key module 4. For example, the touch display panel 5B is a resistive touch display panel or a capacitive touch display panel. When a specified keycap 41 of the see-through key module 4 is pressed by the user, the keycap 41 is moved downwardly. Consequently, the corresponding hollow key frame 42 is moved downwardly to trigger the underlying touch display panel 5B. Consequently, the control device 1B issues or executes a control signal or a command corresponding to the graphic image 53 under the keycap 41.

In this embodiment, the touch display panel 5B is located under the see-through key module 4. The touch display panel 5B can be used to detect the pressing action of the user. Consequently, the control device 1B of this embodiment is not equipped with the switch circuit and the contact point layer. That is, the hollow key frame 42 is moved downwardly to trigger the underlying touch display panel 5B directly. The top cover 2, the outer casing 3 and the see-through key module 4 in the control device 1B of the second embodiment are similar to those of the control device 1A of the first embodiment, and not redundantly described herein. In case that the touch display panel 5B has the capacitive touch control mechanism, the hollow key frame 42 is made of metallic material such as aluminum alloy, aluminum magnesium alloy or zinc alloy. Consequently, the underlying touch display panel 5B can be triggered more effectively.

In order to prevent the hollow key frame 42 from scratching the touch display panel 5B, the control device 1B of this embodiment is equipped with a protection layer 8 between the see-through key module 4 and the touch display panel 5B. While the hollow key frame 42 of the see-through key module 4 is moved downwardly, the hollow key frame 42 is firstly contacted with the protection layer 8. Since the hollow key frame 42 is not in direct contact with the touch display panel 5B, the function of protecting the touch display panel 5B through the protection layer 8 can be achieved. In addition, since the sound generated in response to the collision between the hollow key frame 42 and the touch display panel 5B is reduced, the noise reducing function is also achieved.

The protection layer 8 is made of soft material, e.g., polyester film, foamed film or silicon rubber film. Preferably, the protection layer 8 is a one-piece structure with at least one light-transmissible opening 81. In case that the protection layer 8 is the one-piece structure, the protection layer 8 has the light-transmissible property. For example, the protection layer 8 is transparent or translucent. The at least one light-transmissible opening 81 of the protection layer 8 is overlapped with the corresponding light-transmissible opening 4412 of the upper film layer 441 and the corresponding light-transmissible opening 4432 of the lower film layer 443 along the vertical direction. In addition, the sizes of the light-transmissible openings 81, 4412 and 4432 are equal or nearly equal.

Figure 14:
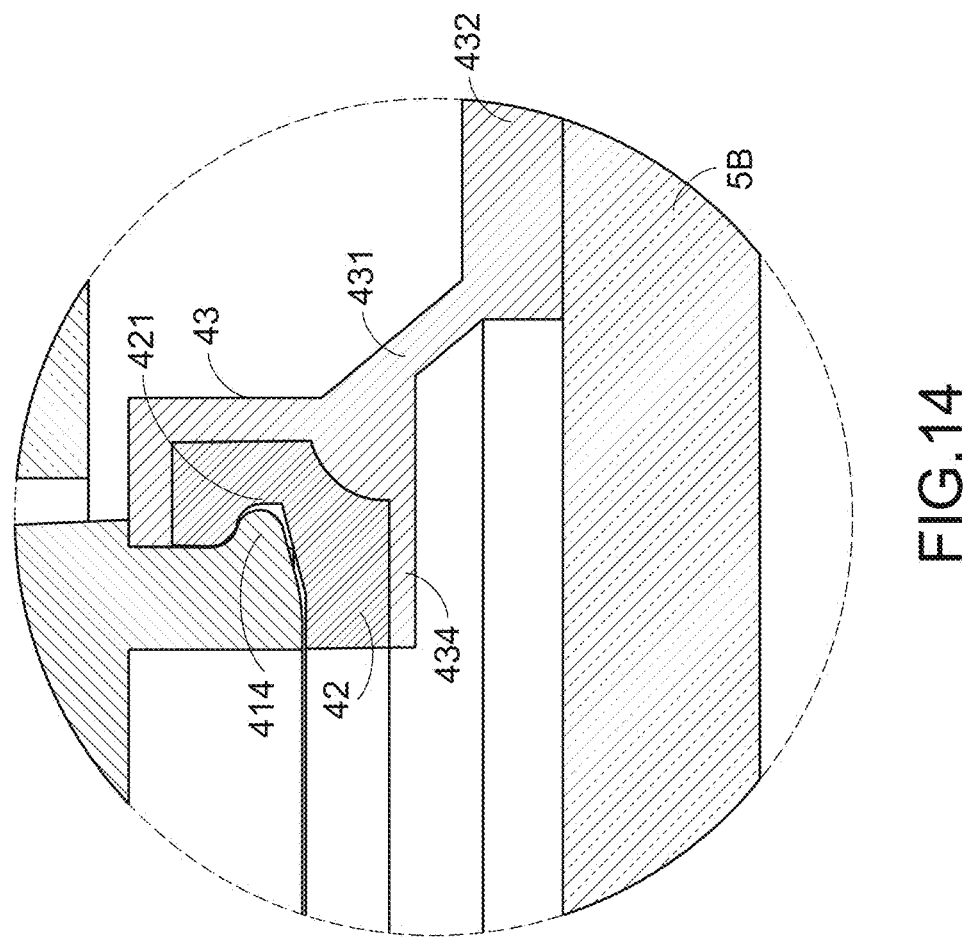
FIG. 14 is a schematic cross-sectional view illustrating an enlarged portion of a support part of the elastic element of the control device according to the second embodiment of the present invention.

FIG. 14 is a schematic cross-sectional view illustrating an enlarged portion of a support part of the elastic element of the control device according to the second embodiment of the present invention. In order to prevent the hollow key frame 42 from scratching the touch display panel 5B, the control device may be further modified. In a variant example, the elastic element 43 further comprises a support part 434. The support part 434 is protruded from bottom side of the elastic element 43 and internally extended in the direction to the bottom side of the corresponding hollow key frame 42. That is, the support part 434 of the elastic element 43 is arranged between the corresponding hollow key frame 42 and the touch display panel 5B. Consequently, while the keycap 41 is pressed and the corresponding hollow key frame 42 is correspondingly moved downwardly, the hollow key frame 42 is not in direct contact with the touch display panel 5B. That is, the support part 434 of the elastic element 43 is contacted with the touch display panel 5B. Since the hollow key frame 42 is not in direct contact with the touch display panel 5B, the function of protecting the touch display panel 5B is achieved. In addition, since the sound generated in response to the collision is reduced, the noise reducing function is also achieved.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. A control device, comprising:
   a display panel, wherein at least one graphic image and at least one non-graphic image are shown on the display panel; and
   a see-through key module located over the display panel, wherein the at least one non-graphic image is shaded by the see-through key module along a vertical direction, and the graphic image is exposed through the see-through key module, wherein the see-through key module comprises:
   at least one keycap, wherein each of the at least one keycap is a light-transmissible hard structure and comprises a first engaging structure;
   at least one hollow key frame, wherein each of the at least one hollow key frame comprises a second engaging structure, and each of the at least one keycap and rea corresponding hollow key frame are detachably connected with each other through the first engaging structure and the second engaging structure; and at least one elastic element arranged between the display panel and the keycap, wherein each of the at least one elastic element comprises a hollow elastic wall and a hollow lower part, wherein the hollow key frame is fixed on the hollow elastic wall, the hollow elastic wall is arranged between the corresponding hollow key frame and the hollow lower part, and the hollow elastic wall is permitted to be subjected to deformation and returned to an original position, wherein the at least one graphic image shown on the display panel is transmitted upwardly and exposed through the hollow lower part of a corresponding elastic element, the hollow elastic wall of the corresponding elastic element, the corresponding hollow key frame and a corresponding keycap.

2. The control device according to claim 1, wherein each of the at least one hollow key frame is a hard structure.

3. The control device according to claim 2, wherein each of the at least one hollow key frame is made of polycarbonate, polyoxymethylene, aluminum alloy, aluminum magnesium alloy or zinc alloy.

4. The control device according to claim 1, wherein the hollow elastic wall of each of the at least one elastic element and the corresponding hollow key frame are combined together by using an embedding injection process, an embedding extrusion process, a double injection or a glue bonding process.

5. The control device according to claim 1, wherein the first engaging structure of each of the at least one keycap is a hook, and the second engaging structure of each of the at least one hollow key frame is a locking recess.

6. The control device according to claim 1, wherein each of the at least one hollow key frame further comprises at least one bump structure, and the at least one bump structure is formed on a bottom edge of the corresponding hollow key frame.

7. The control device according to claim 1, wherein the control device further comprises a switch circuit, and the switch circuit is arranged between the see-through key module and the display panel.

8. The control device according to claim 7, wherein the switch circuit comprises an upper film layer, a spacer structure and a lower film layer, wherein the upper film layer comprises a first top surface, at least one first light-transmissible opening and a first bottom surface, and the lower film layer comprises a second top surface, at least one second light-transmissible opening and a second bottom surface, wherein the at least one first light-transmissible opening of the upper film layer is arranged between the first top surface of the upper film layer and the first bottom surface of the upper film layer, the first bottom surface of the upper film layer faces the lower film layer, the at least one second light-transmissible opening of the lower film layer is arranged between the second top surface of the lower film layer and the second bottom surface of the lower film layer, the second top surface of the lower film layer faces the upper film layer, and the at least one graphic image shown on the display panel is transmitted upwardly through the at least one second light-transmissible opening of the lower film layer and the at least one first light-transmissible opening of the upper film layer, wherein the spacer structure is arranged between the first bottom surface of the upper film layer and the second top surface of the lower film layer, and the upper film layer and the lower film layer are separated from each other by the spacer structure.

9. The control device according to claim 8, wherein the upper film layer further comprises at least one first circuit contact point, and the at least one first circuit contact point is formed on the first bottom surface of the upper film layer, wherein the lower film layer further comprises at least one second circuit contact point, and the at least one second circuit contact point is formed on the second top surface of the lower film layer, wherein the at least one first circuit contact point of the upper film layer and a corresponding second circuit contact point of the lower film layer are overlapped with each other along the vertical direction, and the at least one first circuit contact point of the upper film layer and the corresponding second circuit contact point of the lower film layer are separated from each other by the spacer structure.

10. The control device according to claim 9, wherein each of the at least one hollow key frame and a corresponding first circuit contact point of the upper film layer are overlapped with each other along the vertical direction, and each of the at least one hollow key frame and a corresponding second circuit contact point of the lower film layer are overlapped with each other along the vertical direction.

11. The control device according to claim 9, wherein each of the at least one hollow key frame further comprises at least one bump structure, and the at least one bump structure is formed on a bottom edge of a corresponding hollow key frame, wherein each of the at least one bump structure, a corresponding first circuit contact point of the upper film layer and a corresponding second circuit contact point of the lower film layer are overlapped with each other along the vertical direction.

12. The control device according to claim 9, wherein the spacer structure comprises at least one ink structure, and the at least one ink structure is formed on the first bottom surface of the upper film layer or the second top surface of the lower film layer, wherein the at least one ink structure is located near the at least one first circuit contact point of the upper film layer or the at least one second circuit contact point of the lower film layer.

13. The control device according to claim 9, wherein the spacer structure comprises a separation film layer, and the separation film layer comprises at least one third light-transmissible opening and at least one indented region, wherein the at least one first light-transmissible opening of the upper film layer, a corresponding second light-transmissible opening of the lower film layer and a corresponding third light-transmissible opening of the separation film layer are overlapped with each other along the vertical direction, and the at least one first circuit contact point of the upper film layer, a corresponding indented region of the separation film layer and a corresponding second circuit contact point of the lower film layer are overlapped with each other along the vertical direction.

14. The control device according to claim 9, wherein the control device further comprises a contact point layer, and the contact point layer is arranged between the upper film layer and the see-through key module, wherein the contact point layer comprises a third top surface, a third bottom surface and at least one bump structure, wherein the at least one bump structure of the contact point layer is formed on the third top surface of the contact point layer, and the at least one bump structure of the contact point layer, a corresponding first circuit contact point of the upper film layer and a corresponding second circuit contact point of the lower film layer are overlapped with each other along the vertical direction.

15. The control device according to claim 9, wherein the control device further comprises a contact point layer, and the contact point layer is arranged between the upper film layer and the see-through key module, wherein the contact point layer comprises a contact point region and a light-transmissible region, the non-graphic image is covered by the contact point region along the vertical direction, and the graphic image is exposed through the light-transmissible region along the vertical direction.

16. The control device according to claim 1, wherein the display panel is a touch display panel.

17. The control device according to claim 16, wherein the touch display panel has a resistive touch control mechanism or a capacitive touch control mechanism.

18. The control device according to claim 16, wherein the control device further comprises a protection layer, and the protection layer is arranged between the see-through key module and the touch display panel.

19. The control device according to claim 16, wherein each of the at least one elastic element further comprises a support part, and the support part is contacted with a bottom side of a corresponding hollow key frame.

\* \* \* \* \*